Figure 1:
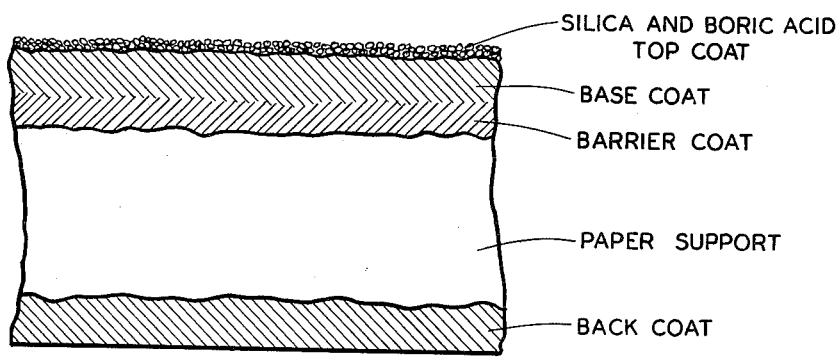

Jan. 23, 1962  H. K. SALZBERG  3,017,826
PLANOGRAPHIC PRINTING PLATE
Filed May 26, 1960

INVENTOR
HAROLD K. SALZBERG
BY
ROBERT CALVERT
ATTORNEY.

3,017,826
PLANOGRAPHIC PRINTING PLATE
Harold K. Salzberg, Bainbridge, N.Y., assignor to The Borden Company, New York, N.Y., a corporation of New Jersey
Filed May 26, 1960, Ser. No. 32,036
9 Claims. (Cl. 101—149.2)

This invention relates to silica coating of protein films. It is particularly useful in making planographic plates for duplication printing and will be illustrated in connection with such use.

Such plates may now be made for use in lithographic printing, by applying to the paper base a coating of casein with a large proportion of clay filler and then applying thereover a particulate, water absorbing and retaining top coat of fine silica in aqueous suspension containing a volatile acid such as acetic acid to promote bonding of the fine silica to the casein. The plate is dried after each coating.

Duplication by lithography is effected by first typing or drawing the image (to be printed) areas on the plate with oily ink and then, during the printing operation, wiping the entire plate alternately with water and with a hydrophobic, i.e., lipophylic ink. The fine structure of silica top coat on the exposed face of the plate causes the water to wet the non-oiled, non-image areas only of the plate; the oily ink prevents adhesion of water to the image areas and, in the following ink wipe, promotes adherence of the lipophylic ink to the image areas. The ink adheres only to the image areas that are to be printed. The image-adhering ink is then immediately transferred by conventional printing machine and technique as an impression on the sheet to be printed, usually by intermediate transfer first to a roll and then to the sheet, so that the impression on the sheet will be an exact duplicate of the image.

In the repeated use to which the plates are subjected, with the many alternating wipings with water and ink, there is deterioration of those areas of the plate which are wetted by the water. I have discovered that this deterioration is increased by the softening effect of the acid of the top coat on the casein-containing base coat. Even though the acid used is volatile, the acid remains in the plate for a considerable time as is shown by unrolling a dried roll of the planographic printing sheet and noting the odor of acetic acid or like volatile acid.

The present invention provides a composition and process by which those areas which the water wets are made more resistant than formerly to deterioration on the repeated contact with water.

Briefly stated, the invention comprises the herein described process and the article made by the inclusion of boric acid or like solid, weak acid in the silica top coating which is applied over a protein film. In the preferred embodiment of the invention, the article is a planographic printing plate.

In an embodiment that is particularly satisfactory, the invention comprises the use of the protein in the form of its compound with zinc, e.g., zinc casein, and bringing this zinc protein compound into contact with a weak acid, the salt of which with zinc is insoluble, as in the case of zinc borate.

In the drawing, FIG. 1 is an enlarged sectional view of the finished planographic plate including, in this embodiment, the back coat.

Figure 2:
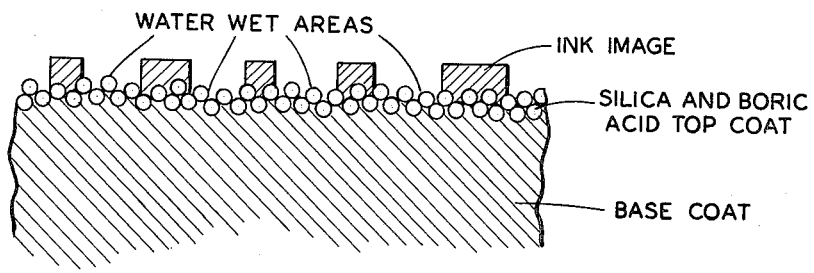

FIG. 2 is a fragmentary section, on an enlarged scale, showing the alternating wetted and inked areas at the time of use of the plate in printing.

The general method of the invention includes coating paper, of a grade commonly used for planographic printing plates, consecutively with (1) a clay dispersion in an alkaline solution of casein, suitably casein that has been treated in dry form with a nonionic surfactant and with zinc oxide or other zinc compound, followed by (2) coating with a combination of very fine silica and boric acid. Certain auxiliary ingredients contributing to the overall quality of the plate in commercial use may be admixed with the clay-casein and silica-acid dispersions before the coatings of them are formed.

In a severe, accelerated test of the effect of my composition and process on the deterioration of the planographic plate on use, seven plates were made. These represented compositions and processing using (1) acetic acid in the top coat, to anchor fine silica to the casein and clap base, and (2) boric acid in place of the acetic acid. Persons experienced in planographic plate evaluation found the results on printing from the imaged area to be best with my boric acid composition. The test was made most severe by erasing the original printed image on each of the plates and then reimaging, as by typing or marking over the erased areas.

In general, it has been found that the use of the boric acid as a binder for silica in the top coat of the planographic plate gives the necessary adhesion of silica to the base coat of casein or the like with preservation of the desired water resistance of the casein base coat.

The boric acid in contact with some forms of casein, such as zinc casein, may actually improve substantially the water resistance over that of casein in the absence of any acid.

As the paper base, I use any conventional paper base for planographic printing plates, a sulfite or kraft paper, or a paper of blended sulfite and kraft pulp, the paper being of thickness selected for the given use.

The paper is sized, as with rosin and alum. For best results, I provide wet strength by incorporation of a thermosetting aminoplast resin such as a urea-formaldehyde or melamine-formaldehyde condensate, this component being introduced into the paper in its pulp stage.

To provide the barrier coat, I may use rosin, a rosin ester, or a drying fatty glyceride oil. The barrier coat or "top size" is ordinarily applied after the paper web has been formed, in conventional manner. The barrier decreases excessive water penetration into the paper base during use. After the application of the barrier coat, the paper sheet passes over the steam drying drums and to the windup roll, at the end of the machine. Here the paper accumulates in rolls to be later coated and processed to the final planographic plate.

The protein used must be one that is dispersible or soluble in water in contact with alkali or acid in amount to establish the pH on either side of the isoelectric point, film-forming from an aqueous solution thereof on drying, and hard and tough enough in the dried film form to withstand contact with water. Proteins that I can use are casein, soy protein, suitably isolated from the seed meal, animal glue or gelatin. Because casein is especially satisfactory as the protein, I will first illustrate the invention with it as the protein selected.

As the filler to be mixed with the casein or other protein, I find no other material, that in view of cost and effectiveness, is better than finely divided clay of kind and of particle size that is common in clay for coating of paper. A typical clay that I use is ASP-600, a kaolin from the Minerals and Chemicals Corporation. Other fillers, such as finely divided or precipitated calcium carbonate, titanium dioxide, barytes, magnesia or diatomaceous earth may be used, suitably in combination with the clay. Also I may use finer grades of clay in admixture with ASP-600 in order to increase the fineness of dispersion of the clay in the aqueous casein composition used in forming the base coat.

To promote solution of the casein I ordinarily introduce an alkali of kind commonly used to dissolve casein as, for instance, ammonia.

To promote dispersion of the clay or other filler in the protein suspension to be used in forming the base coat, I can and ordinarily do include a usual type of clay dispersing agent, as for example, tetrasodium pyrophosphate, sodium hexamethaphosphate, or sodium polyphosphate.

For best results I introduce auxiliary ingredients into the protein-clay suspension to be used in forming the base coat of kind and in proportions that are common practice in such compositions, examples being a preservative for the protein such as sodium o-phenylphenate and defoamers of which pine oil, lauryl alcohol, tributyl citrate and methyl isobutyl ketone are examples.

A plasticizer for the protein may be and suitably is incorporated therewith. The plasticizer is a substantially non-volatile material that has the property of decreasing the brittleness of protein films when present therein. Examples of plasticizers that meet the requirements and illustrate the class to be used are glycerine, sorbitol, and polyoxyethylene derivatives of sorbital such as one using 6 moles of ethylene oxide to 1 mole of sorbitol, available as Atlas G-2240.

A particularly satisfactory form of casein for the present purpose is any combination of casein with a non-ionic surfactant described by Salzberg and King in Patent No. 2,933,406 issued April 19, 1960, on Serial No. 683,225. Examples are combinations of any of the proteins described herein with an oiled-on nonionic surfactant selected from the group consisting of water- and ether-soluble surface-active ethers, esters, ether-esters, and ether-alcohols in the proportion of 1–10 parts by weight for 100 parts of the protein. Surfactants that illustrate this class of nonionic and that I can use are alkylphenyl (such as octylphenyl) ether of polyethylene glycol; polyoxyethylene thioethers; polyoxyethylene derivative of propylene glycol, sorbitan monolaurate, oleate, or palmitate; glycerine monostearate or laurate; and polyoxyethylene derivatives of the glycerine esters named above.

To provide the zinc for hardening the protein, I introduce a zinc compound that is reactive with the protein, without precipitating the protein from its solution. Examples are the substantially non-acidic zinc carbonate, zinc oxide, or zinc ammonium chloride, none of which curdle the protein solution. Particularly satisfactory are the insoluble zinc carbonate and oxide.

Casein, mixed with the surfactant and with the clay in the amounts shown in the said patent or herein, when spread as an aqueous dispersion on paper or the like and allowed to dry in a thin layer, gives a film that is remarkably smooth and free from craters and pin holes. Such a film provides a good base coat, of minimum if any surface imperfections, to be adhered to the top coat of silica mixed with acid as described herein.

As the silica which is applied in aqueous suspension over the protein base coat, to provide the top coat on the face of the planographic plate, I use to advantage a fine silica suspension known as silica aquasol or, for better results, an aqueous suspension of fumed silica made as described in U.S. Patent No. 2,912,342.

As the acid incorporated into the silica suspension, from which the top coat is to be formed, I use boric acid. I have found no advantage in any other acid, even when solid, as for instance in the use of arsenious, selenic, of telluric acid or mixtures thereof, to offset the disadvantages in the use of such toxic or more expensive materials.

As to proportions, the amounts of the sizing, wet strength material and barrier composition are conventional.

Proportions of materials in the base coat and top coat that are permissible and that are recommended for commercial use are as follows, proportions here and elsewhere herein being expressed as parts by weight.

|  | Parts by Weight | |
|---|---|---|
|  | Permissible | For Best Results |
| Materials of Base Coat: | | |
| Casein or other protein | 100 | 100 |
| Clay or other filler | 100–500 | 200–400 |
| Dispersant for the clay | 0–5 | 0.1–2 |
| Surfactant | 0–10 | 1–5 |
| Preservative | 0–20 | 2–5 |
| Zinc compound as ZnO | 0–25 | 3–10 |
| Plasticizer | 0–50 | 10–30 |
| Top coat: | | |
| Silica | 100 | 100 |
| Boric acid | 50–300 | 100–200 |

Water is used for forming the suspension of both the base and top coats in amount to make the suspensions readily flowable and self-leveling in film form.

The weights of the base and top coats per unit area of paper base are somewhat variable. The following amounts represent satisfactory ratios: 10–40 pounds of base coat and 0.25–1 pound of top coat for 1 ream of 3,000 sq. ft. of paper.

The proportion of the zinc compound to be used is ordinarily about that which the casein is capable of absorbing. At the degree of alkalinity typical of the base coat, the capacity of the casein to absorb zinc is about 6–8 parts of zinc, calculated as zinc oxide, for 100 parts of casein.

As to conditions of operation, the zinc casein is made in any conventional manner as for example by mixing casein with sufficient water to moisten it, suitable proportions being about 20 to 30 parts of water for 100 parts of the casein, and with the selected zinc compound. Then the mixture is heated to and held at about 150° F. for completion of the action, to give the zinc casein. This requires about 15–60 minutes.

The base coat is applied to the paper in usual manner, as for instance by roller coating of the liquid coating at a pH sufficiently above the isoelectric point as to maintain solution of the casein in the water. A suitable pH range is 7–10. The base coat is dried, as at 120°–150° F., and, for best results, is aged as in a roll for at least about a day. The boric acid is admixed into the aqueous suspension of the fine silica, a suitable proportion of water in this suspension being about 90–98 parts of water for 100 parts total weight of the water and silica and usually about 95 parts of the water. The resulting aqueous suspension of the fine silica and boric acid is then applied over the base coat of casein as by roller, brush, or spray coating, in any case with usual machinery and technique. This application is light, so as to make the top coat thinner than the base coat. The finished article so made is then heated at a moderate temperature such as 120°–140° F. until dry.

The invention will be further illustrated by description in connection with the following specific examples of the practice of it.

EXAMPLE 1

*Base coating.*—Dry lactic acid process casein from cow's milk was oiled with the surfactant, to coat the surfaces of the particles, then mixed with the other treating chemicals, and passed through heated differential speed rolls in order to mix the materials and sheeted. The proportions of materials used were as follows:

| Component: | Lbs. |
|---|---|
| Lactic casein—30-mesh | 100 |
| Non-ionic surfactant | 2.1 |
| Zinc carbonate | 5.3 |
| Ammonium hydroxide—28% $NH_3$ | 2.5 |
| Water | 22 |

The sheet was broken up, and the resulting particles dried and ground to pass through a 50-mesh screen.

A solution of the casein, hereinafter referred to as PV–416, was next prepared on the following formula:

| Component: | Lbs. |
|---|---|
| Casein PV–416 (about 38 actual casein) | 50 |
| Water | 190 |
| Plasticizer—the polyoxyethylene sorbitol | 3.5 |

The resulting casein solution while still warm was added to a clay slip which had been mixed cold as follows:

| Component of slip: | Lbs. |
|---|---|
| Paper coating clay—ASP 600 | 125 |
| Water | 75 |
| Dispersant—tetrasodium pyrophosphate | 0.2 |

The combined clay and casein mixture was then treated with a mixture of:

| | | |
|---|---|---|
| Casein preservative—sodium o-phenylphenate | lbs | 2 |
| Defoamer—methyl isobutyl ketone | lbs | 5 |
| Ammonium hydroxide to pH | | 8.4 |

*Final coating composition.*—The resulting blend was passed through a colloid mill, to insure homogeneity and freedom from lumps or undissolved particles of the soluble materials.

The dried paper was base-coated with this final coating composition diluted with 15 parts of water for 100 parts of the said composition. The dilution reduced the solids content to about 36.1% and the viscosity to 1660 cps. at 70° F., this and other viscosities herein being Brookfield at 20 r.p.m. The coating was applied on a John Waldon coater operated at 85 feet per minute, with beta thickness gauge set at 53 and blower pressure at 3.5 p.s.i. At these settings 14.75 pounds of the said final coating composition on the dry basis was spread on the paper per ream (3,000 sq. ft.) increasing the overall weight to 84.95 pounds per ream, corresponding on the dry basis to about 21% of coating on the basis weight of the paper. The coating is continuous and of thickness, in various runs, within the range approximately 0.0002–0.002 inch.

*Evaluation of the base-coated paper.*—Inspection of the base-coat after drying, at a magnification of 25×, revealed no microscopic pinholes in the surface.

*Top coating.*—The top coating composition was an aqueous suspension of the following composition:

| Component: | Lbs. |
|---|---|
| Water | 180 |
| Submicroscopic silica | 10 |
| Boric acid | 10 |

The silica component is of actual silica content above 99% and the product of oxidizing fumes of silicon sulfide. A typical sample of this silica has a surface area of about 140 square meters per gram, a particle diameter of 0.01–0.2 micron, and a bulk density of about 4 lbs. per cubic foot.

The pH of the silica and boric acid dispersion in water is 3.8, which represents a degree of acidity desired for application to my base coat. The coated paper was dried at about 140° F.

The dispersion including the boric acid adheres durably to the base coat throughout the contacts with the fluids during a long run in planographic printing. The sheet receives the inked image without distortions of microscopic size, such as would result if there were surface imperfections such as holes and craters in the base coat, and the casein of the base in contact with the boric acid does not soften in the repeated contacts of the planographic plate with water.

EXAMPLE 2

Except as stated, the procedure and technique were as in Example 1.

The base coating formula, originally mixed in the two parts, was:

| Component: | lbs. |
|---|---|
| Casein PV–416 | 300 |
| Water | 1,740 |
| Ammonium hydroxide—28% NH$_3$ | 3 |
| Methyl isobutyl ketone | 37.5 |
| Polyoxyethylene sorbitol (Atlas G–2240) | 24 |
| Clay–ASP 600 | 750 |
| Water | 450 |
| Sodium hexametaphosphate | 2.5 |
| Ammonium hydroxide—28% NH$_3$ | 1.5 |

It is noted that the defoamer, methyl isobutyl ketone, was added to the casein solution, and ammonium hydroxide was introduced into both the clay slip and casein solution, to alkalize and promote dispersion of the clay and to insure solution of the casein.

The complete coating was homogenized by ball milling and the resulting liquid coating was screened before transfer to the coater.

The raw paper stock used for the coating was a wet strength paper of 62-lb. basis weight, width 62½ inches, trade name "Riegel Wetrap."

The liquid coating as applied to the paper was of total solids content 32%, pH 8.38, and viscosity 120 cps. at 110° F. The coating was applied warm at 110° F., to both sides of the paper, with a brush coater operating at 170 feet per minute. The coated paper was dried in a festoon dryer at about 140° F. There was very little curling or wrinkling. The paper was subsequently calendered.

*Top coating.*—The dried product was then top coated and finished as in Example 1. Both face and back of the plate can be used in lithographic printing.

EXAMPLE 3

A planographic printing plate was made according to the procedure of Example 1 except that the base coating was applied also to the back of the paper. This coating on the back prevents warping or other distortion of the plate when exposed to varying moisture conditions. The base coat may be, and suitably is, applied to the back exactly as described for the application of the base coat to the face of the sheet as in Example 1. The silica and boric acid top coat was omitted from the back, however.

The back coat need not be identical with the base coat, but should resemble the base coat to a degree that the fully coated paper will not exhibit marked two-sidedness in use. A composition for treating the back only of the sheet of paper was of the following formula:

| Component: | | |
|---|---|---|
| Lactic casein, untreated | lbs | 30 |
| Water | lbs | 120 |
| Ammonium hydroxide—28% NH$_3$ | lbs | 3 |
| Clay–ASP 600 | lbs | 200 |
| Water | lbs | 110 |
| Tetrasodium pyrophosphate | lbs | 1 |
| Plasticizer—Poly(ethyl acrylate) as 40% emulsion | lbs | 10 |
| Preservative—sodium o-phenylphenate | lbs | 4 |
| Defoamer—pine oil | lbs | 1 |
| Defoamer—lauryl alcohol | lbs | 0.06 |
| Ammonium hydroxide—to pH | | 7.4 |
| Paper makers' blue, to light blue color. | | |

In the application of this back coat the formulation shown immediately above is ordinarily diluted with about 25 parts of additional water for 100 parts of the composition shown, to reduce the total solids content to approximately 41% by weight and the viscosity to 1,300 cps. at 60° F. The coating was applied on the Waldron coater run at 100–150 feet per minute, with beta thickness gauge set at a reading of 43, blower pressure on the line at 1.3 p.s.i. and the opening in the microjet of 0.03 inch.

The coating was applied at the rate of 15.2 pounds per ream of paper, this increasing the overall weight to 70.2 pounds per ream on the dry basis.

EXAMPLE 4

The composition and procedure of any of the Examples 1–3 are repeated in order, except that the casein used therein is replaced by an equal weight of gelatin.

EXAMPLE 5

The composition and procedure of any of the Examples 1–3 are repeated in order, except that the casein used therein is replaced by an equal weight of isolated soy protein.

The plates made as described, when exposed to the alternate wipings with ink and water, in lithographic duplication printing, possess the particulate surface of the top coat necessary to absorb and retain water in the areas that have not been greased or oiled in advance and to retain the said ink over the image areas; show the required continued adherence of the fine particles of silica to the base coating of protein and clay composition; and at the same time prevent and protect the paper base and the protein base coat against deterioration on repeated contact with water, so as to extend substantially the number of cycles of printing which may be effected with the plate.

EXAMPLE 6

The compositions and procedures of the Examples 1–5 are used, in order, except that the paper sheet used as the base to be coated is replaced by cellophane, polyethylene or other plastic base, or a woven fabric such as cotton, in equal area in each case.

EXAMPLE 7

The composition and procedure of Example 1 is used except that the paper sheet used as the base is to be coated is replaced by an equal area of a rigid sheet, the sheet being fibre board or wood veneer.

EXAMPLE 8

The composition and procedure of Example 1 is used except that the polyoxyethylene sorbitol there used is replaced in turn by an equal weight of each of the following surfactants:

Spans ($C_{12}$–$C_{18}$ higher fatty acid partial esters of hexitol anhydrides), Tweens (polyoxyalkylene derivatives of Spans), Igepal CTA (aromatic polyglycol ether), Pluronics L64 (a liquid polymeric ether-alcohol such as the ethylene oxide derivative of propylene glycol of m.w. about 1500–1800 (corresponding to a molecular weight after alkoxylation of about 3,000) and ethylene oxide content 40%–50%, that may be prepared as described in U.S. Patent 2,677,700), Antarox (aromatic polyglycol ether), Triton 100 (an alkyl aryl polyether alcohol), Sterox (a polyoxyethylene thioether), Myverol (glycerol monostearate), Myrj (polyoxyethylene stearate), Brij (polyoxyethylene lauryl alcohol), Nopalcol (ethylene oxide condensate with a fatty acid), and Surfynol (ditertiary acetylenic glycol derivatives).

It will be understood that it is intended to cover all changes and modifications of the examples of the invention herein chosen for the purpose of illustration which do not constitute departures from the spirit and scope of the invention.

I claim:

1. In adhering a top coat of finely divided silica over a dried layer including a protein selected from the group consisting of casein, soy protein and gelatin, the process which comprises applying the fine silica in an aqueous dispersion containing boric acid, and then drying the applied dispersion, the boric acid improving the anchorage of the silica to the protein layer and the resistance of the protein layer to water.

2. In making a water-resistant coating on a sheet, the process which comprises applying to the sheet a coating composition containing casein and a zinc compound reactable with the casein without causing curdling thereof, heating the casein and zinc compound at a temperature of at least about 120° F. until no further reaction between the casein and the zinc compound occurs, then applying over the said coating composition in dry condition a top coat of an aqueous dispersion of finely divided silica containing boric acid in the proportion of about 50–300 parts of the boric acid for 100 parts of the silica, and drying the resulting article.

3. In making a planographic printing plate, the process which comprises applying to a paper sheet an aqueous dispersion of finely divided clay and of a protein selected from the group consisting of casein, soy protein and gelatin in the proportion of about 100 parts of the protein for 100–500 parts of the clay, drying the applied aqueous dispersion to form a base coat, then applying thereover a top coat comprising a silica aquasol and boric acid in the proportion of about 50–300 parts of the boric acid for 100 parts of the silica, and then drying the applied top coat.

4. The process of claim 3, the said aqueous dispersion including a protein-reactable and protein-non-curdling zinc compound in the proportion of about 6–8 parts calculated as zinc oxide for 100 parts of the said protein and the protein and the zinc compound being in the condition of having been heated until substantially no further reaction occurs between them.

5. The process of claim 3 which comprises applying a film of non-ionic surfactant over the particles of said protein before the protein is formed into the said dispersion with the clay, the said surfactant being selected from the group consisting of water- and ether soluble surface-active ethers, esters, ether-esters, and ether-alcohols in the proportion of 1–10 parts by weight for 100 parts of the protein.

6. A planographic printing plate that is resistant to deterioration on being wetted repeatedly with water, the said plate including a paper sheet, a base coat thereon comprising a protein selected from the group consisting of casein, soy protein and gelatin and a chemically inert, finely divided, solid filler dispersed in the protein, and a top coat of finely divided silica and boric acid applied over and adhered to the said base coat.

7. The planographic printing plate of claim 6, the protein being casein, the said filler being clay, and the proportion of the clay being about 100–500 parts for 100 parts dry weight of the casein.

8. The planographic printing plate of claim 7, including an insoluble, non-acidic zinc compound absorbed in and reacted with the casein in the proportion of about 6–8 parts of the said compound calculated as zinc oxide for 100 parts of the casein.

9. The plate of claim 8, the said zinc compound being zinc carbonate.

References Cited in the file of this patent

UNITED STATES PATENTS

| | | |
|---|---|---|
| 2,373,287 | Bassist | Apr. 10, 1945 |
| 2,681,617 | Worthen et al. | June 22, 1954 |
| 2,800,077 | Marrow | July 23, 1957 |
| 2,933,406 | Salzberg et al. | Apr. 19, 1960 |